United States Patent
Gagnon et al.

(10) Patent No.: US 8,269,628 B2
(45) Date of Patent: Sep. 18, 2012

(54) REFRIGERATION CASE MOTION DETECTOR

(75) Inventors: Daniel Gagnon, Westbrook, ME (US);
Paul Lukas, Cape Coral, FL (US);
Robert Baker, Harrison, ME (US)

(73) Assignee: Advance Electronic Concepts, Portland, ME (US)

( * ) Notice: Subject to any disclaimer, the term of this patent is extended or adjusted under 35 U.S.C. 154(b) by 502 days.

(21) Appl. No.: 12/646,586

(22) Filed: Dec. 23, 2009

(65) Prior Publication Data

US 2010/0188217 A1    Jul. 29, 2010

Related U.S. Application Data

(60) Provisional application No. 61/140,653, filed on Dec. 24, 2008.

(51) Int. Cl.
*G08B 13/18* (2006.01)
*G08B 19/00* (2006.01)

(52) U.S. Cl. ......... 340/555; 340/556; 340/557; 340/435

(58) Field of Classification Search .................. 340/435, 340/436, 507, 522, 541, 545.3, 552, 555, 340/556, 557; 56/10.2 R; 250/338.3, 338.5, 250/339.05
See application file for complete search history.

(56) References Cited

U.S. PATENT DOCUMENTS

| | | | | |
|---|---|---|---|---|
| 4,963,742 A * | 10/1990 | Abernathy | .................. | 250/338.5 |
| 6,044,632 A * | 4/2000 | Schmalz et al. | ........... | 56/10.2 R |
| 7,034,675 B2 * | 4/2006 | DiPoala et al. | ................ | 340/522 |
| 7,495,556 B2 * | 2/2009 | Eubelen et al. | ................ | 340/552 |
| 8,035,514 B2 * | 10/2011 | Brown et al. | .................. | 340/555 |
| 8,164,437 B2 * | 4/2012 | Cooper | ........................ | 340/507 |

* cited by examiner

*Primary Examiner* — Van T. Trieu
(74) *Attorney, Agent, or Firm* — Patricia M. Mathers

(57) ABSTRACT

A triple-sensor motion detector is provided for illuminating the approach to a display case or other object. The triple-sensor motion detector provides a field of detection that spans the front width of the case, yet does not include the areas along the sides of the case. The detector reduces inadvertent triggering of the illumination by persons approaching the side of the case or approaching another case on the other side of an aisle.

16 Claims, 12 Drawing Sheets

REFRIGERATION CASE MOTION DETECTOR

BACKGROUND INFORMATION

1. Field of the Invention

The invention relates to a motion detection system for display cases.

2. Description of the Prior Art

Passive infrared (PIR) detectors are often used to trigger illumination. Retail stores, particularly grocery stores, store goods in cases. Some of the upright refrigerated cases have doors on them, others are chest-type refrigerated cases, which are open and readily accessible from above. Often, these cases are constantly illuminated, to better display the goods stored within. For reasons of economy, store owners or operators now frequently desire to keep the illumination turned off, except when a customer approaches the case. There are several known motion detection devices that use PIR motion sensors to control the illumination of display cases. One uses a single PIR motion detector sensor 1 placed centrally on the front face of the case. See FIG. 1. The field of detection or field of view fans out in a cone shape from the sensor and leaves large areas toward the side edges of the case uncovered by the field of view, as shown by the polar plot. The polar plot indicates the sensitivity of the detector, on a scale of 1 to 10, 10 indicating maximum sensitivity. The large areas uncovered by the field of view are null areas N and are less than 5 on the sensitivity scale. The device also detects motion that is too far away from the case, because the greatest sensitivity is in a normal direction to the case. The field of detection is limited to 60 degrees and does not provide 180 degrees field of view, which is required in order to accurately "see" a customer approaching from the sides of a refrigeration case.

A second device uses two PIR motion detector sensors 2 located centrally on the front of the case C, with their axes angled 65 degrees azimuthally to provide a field of detection that is approximately 140 degrees. See FIG. 2. The field of detection from the two sensors covers only partially the central portion of the case, as indicated by the null area in the detection coverage, and also has null areas on either side of the case. Assuming that refrigeration cases are arranged close to each other in rows with the front of the cases of two rows facing each other across an aisle, the dual-sensor device on one case may detect a customer who is approaching a case on the other side of the aisle, yet will fail to detect a customer approaching close to the side of the case. If the device is used on a case that is located at the end of the aisle, such that customers typically approach it on a path that is close to being normal to the case, the device will not trigger until the customer is relatively close. Also, because of the pronounced sensitivity at 30 and 330 degrees, the device will trigger unnecessarily when customers are detected at a greater than desired distance.

Motion detection lighting systems are typically subjected to large numbers of activation cycles during their lifetimes and the number can often exceed the estimated life of a mechanical relay. Some of these lighting systems have ballasts or power supplies that have a high in-rush starting current. This repetitive high starting current decreases the life of the mechanical relay and the power supply.

What is needed is a detection system that detects motion in the front of a display case adequately, without unnecessarily detecting motion off to the side of the case or too far away in front of the case. What is further needed is such a system that avoids null areas in a desired and foreseeable approach path and avoids detection beyond the side edges of the case. What is yet further needed is a device that is simply and quickly incorporated into existing circuitry. What is still yet further needed is such a system with improved reliability.

BRIEF SUMMARY OF THE INVENTION

The invention is a motion detection system, comprising a motion detector module and a power switching module for controlling selective illumination of an area of approach to a specific object or area, such as, for example, a display case, a staircase, a doorway, an obstacle, etc. The motion detection module senses motion and activates the power switching module, which interfaces between a conventional lighting system and the motion detector module. The motion detector module comprises three PIR sensors, i.e., a central sensor and two side-looking or outboard sensors. This triple-sensor motion detector provides useful and intended motion detection across the front face of a display case or other object to be illuminated and reduces the occurrence of inadvertent triggering of the illumination. The inventor has determined that the set of three PIR sensors, properly angled, provides the best field of detection, one that eliminates unnecessary overlap and allows greater control over the size and shape of the field of detection.

Each of the three PIR sensors is aimed with a specific azimuth and elevation angle in relation to the case to produce a desired unit pattern. Each PIR sensor is chosen to be either a dual sensing element or quad sensing element to achieve the best sensing characteristics for the position that the sensor is in. The rotational angle of the sensor in relation to the case is adjusted to provide optimum performance. Each sensor is fitted with a Fresnel lens that focuses the IR energy from the person or target, allowing the sensor to detect at a greater distance. The gain of the circuit that processes the signal from the particular sensor may be adjusted to control the overall sensitivity of the sensor. If it is desirable to block detection in a specified direction, a physical barrier to IR radiation may be employed. The combination of sensors is used to achieve the desired pattern, with each sensor set up as previously described and the signals of all the sensors combined electronically. The motion detector according to the invention may be adjusted to accommodate a wide range of sizes of display cases, for example, from two-door cases all the way up to six-door cases, by adjusting all of the previously mentioned parameters. The previously explained parameters may also be used to adjust the motion detector, such that small animate bodies, such as toddlers or pets, i.e., cats or dogs, do not create false triggers.

The power switching module supplies power to the conventional lighting fixtures when motion is detected by the motion detector module. This power switching module may be a conventional electromechanical relay or a unit specifically constructed to work with the motion detector module. So, for example, the motion detection module according to the invention may be provided as a module that is easily electrically coupled to an existing mechanical relay, or may be provided as a complete unit, with the power switching module and the motion detection module provided as a single packaged unit. In conventional lighting control systems, a relay coil is typically used to switch power to lighting fixtures. The switch on the relay coil typically operates with low voltage (24 VAC). When provided as a module to be coupled with an existing mechanical relay, the motion detector module is simply wired in series with the relay coil circuit of the power control system. The motion detector module enables or disables activation of the relay coil, based on the presence of detected motion. Ideally, the motion detector module is self-powered and does not require a separate power connection, although it is possible to provide a motion detector module according to the invention that is not self-powered.

A solid state relay may be used in place of the mechanical relay, the advantage of the solid state relay being that it does not degrade or wear-out with high cycling rates. The solid state relay may also be selectively turned on at the zero-crossing of the power AC sine-wave, thus greatly lowering the in-rush starting current of the power supply. Additionally, the power module may have a temperature-dependant current-limiting resistor to further limit the in-rush starting current.

The triple-sensor motion detector results in greater energy savings than detectors having a single sensor or two sensors. It reduces or eliminates faulty detection of persons or targets who are not approaching the display case, for example, customers approaching a refrigeration case on the opposite side of the aisle or walking along the side of a case and who are not within a predefined area of approach. This reduces the amount of time illumination is unnecessarily turned on, which reduces energy consumption.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1:
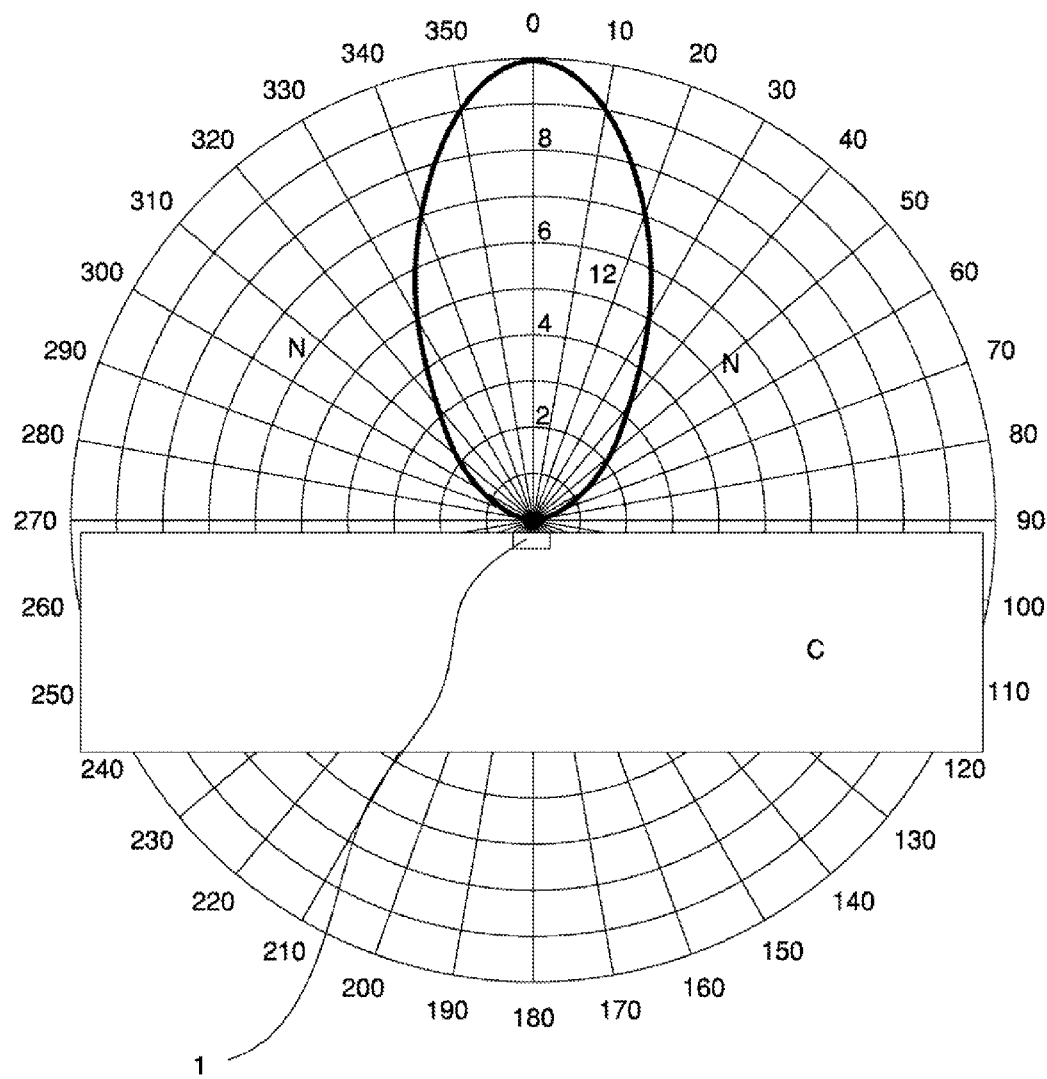
FIG. 1 is a top plane view in polar coordinates, showing the field of detection of a single-sensor motion detector (prior art).
Figure 2:
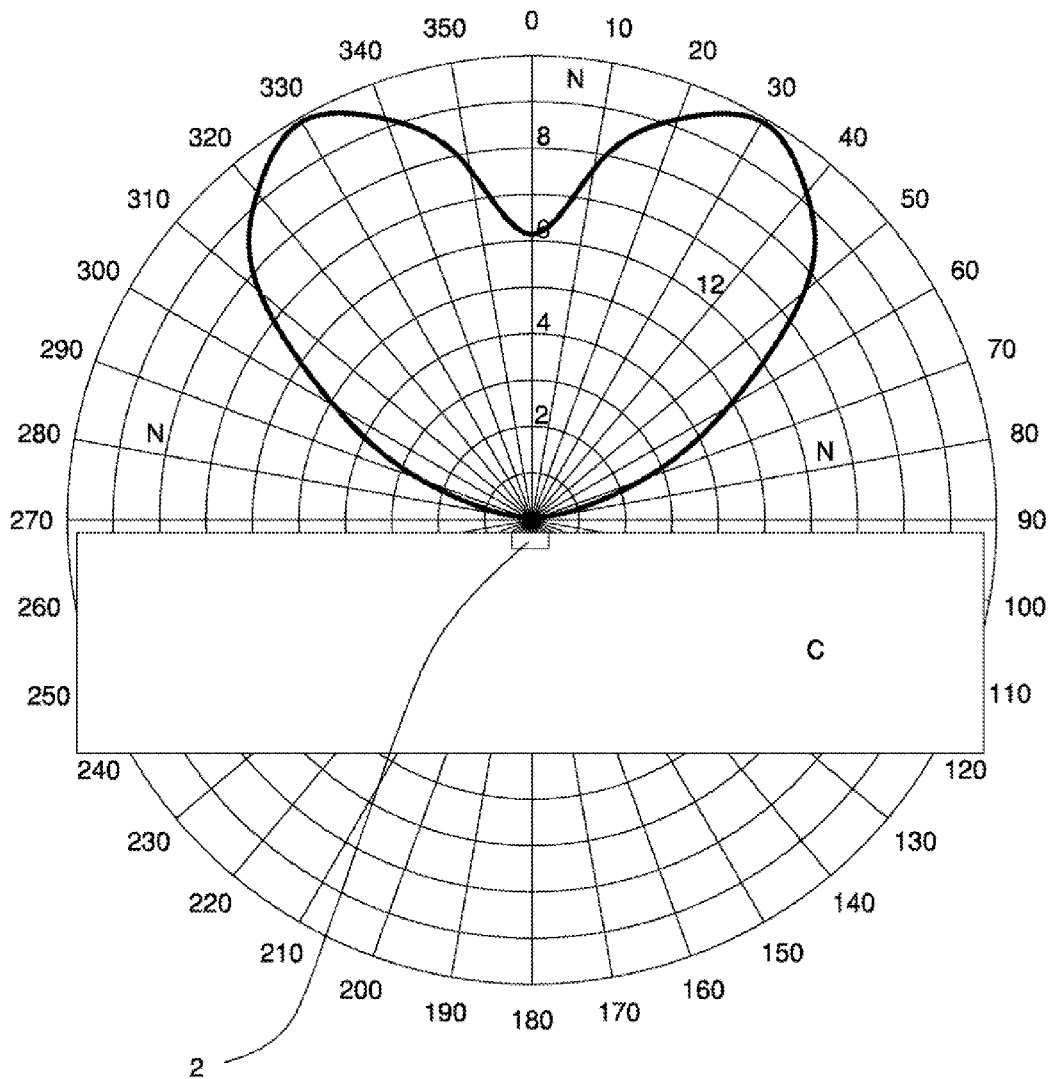
FIG. 2 is a top plane view in polar coordinates, showing the field of detection of a dual-sensor motion detector (prior art).
Figure 3:
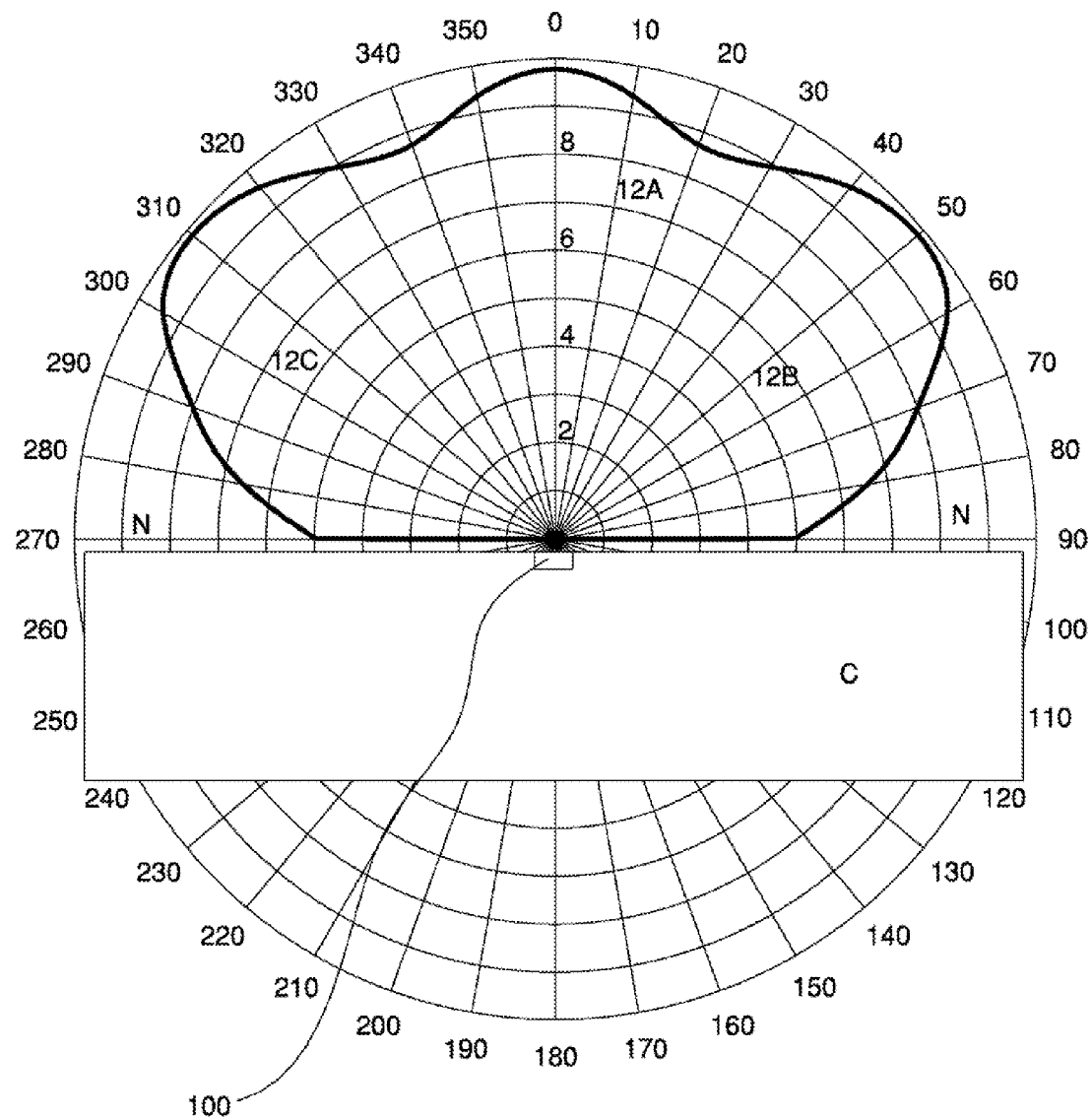
FIG. 3 is a top plane view in polar coordinates, showing the field of detection of a triple-sensor motion detector according to the invention.
Figure 4:
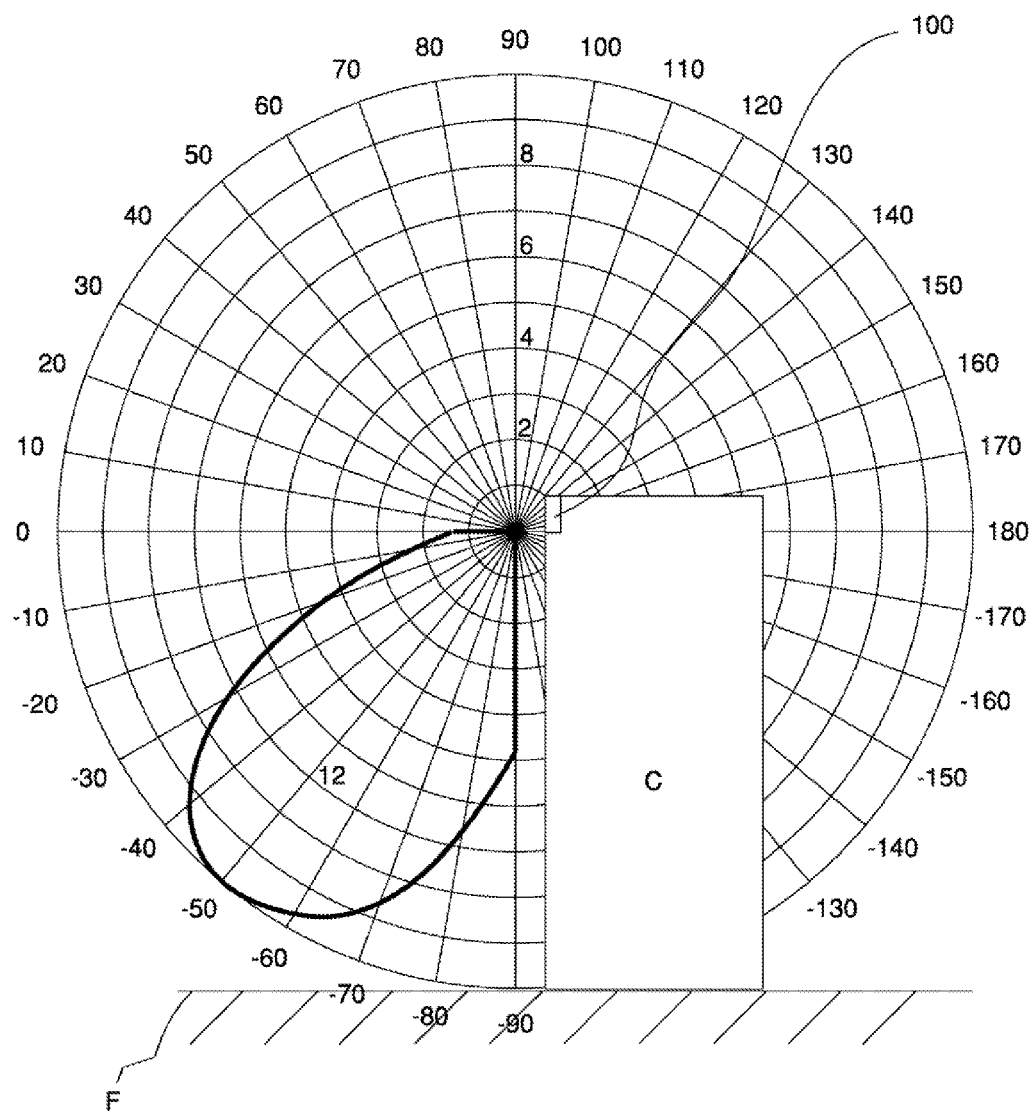
FIG. 4 is a side elevational view in polar coordinates of the triple-sensor motion detector of FIG. 3, mounted on a refrigeration case, illustrating the limited field of detection in the elevational plane.

FIGS. 3 and 4 are top plane and elevational plane views, respectively, of the field of detection of a triple-sensor motion detector 100 according to the invention. The intended purpose of the triple-sensor motion detector 100 is to precisely shape a field of detection, particularly in an approach area to a display case or some other specific object or area, in order to eliminate unnecessary triggering of illumination because a person has incidentally wandered close to the display case or other specific object or area. As used hereinafter, a desired approach area is a predetermined area in front of the object or area to be illuminated; an undesired approach area is the area beyond, yet adjacent to, the desired approach area. A very suitable application for the triple-sensor motion detector according to the invention, for example, is to control the illumination of display cases in stores, such as refrigeration cases in grocery stores. Hereinafter, reference will be made to a display case. It is understood, that this term is representative only and is not in any way limiting with regard to the invention, but rather, that the motion detection system may be used to illuminate the area of approach of various and myriad types of objects and areas.

The triple-sensor motion detector 100 comprises a configuration of three motion sensors 10, which are shown in greater detail in FIGS. 5-8. The field of detection is shown in polar coordinates and the changing sensitivity of the motion sensors 10 is indicated on a scale of 0 to 10, 10 indicating maximum sensitivity. The three sensors 10 are individually designated as 10A, a centrally located sensor, and 10B and 10C, two side-looking or outboard sensors. Each sensor 10 has a field of detection 12, individually designated as a central field of detection 12A and two side-locking fields, 12B and 12C. Areas in the polar projection that are not within the field of detection or are less than 5 on the sensitivity scale are identified as null areas N. The triple-sensor motion detector 100 according to the invention is shown here mounted on a display case C.

FIG. 4 illustrates the field of detection in elevation of the triple-sensor motion detector 100. The display case C is shown installed on a floor F. The illustration shows a 50-degree downward elevation angle of a pattern that may be adjusted to control the distance at which targets are detected.

Figure 5:
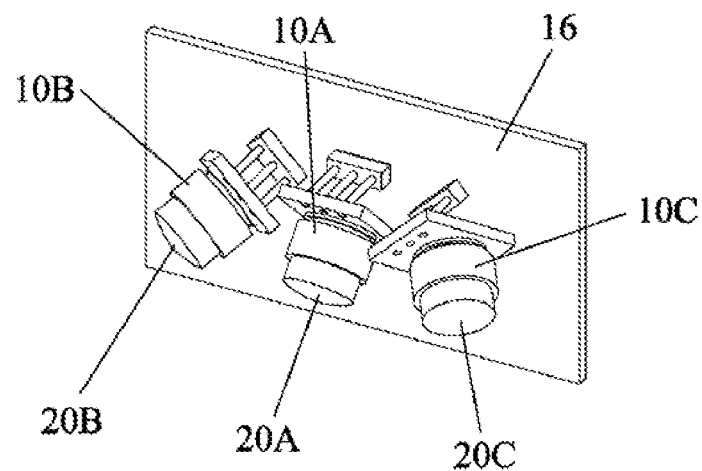
FIG. 5 is a perspective view of the three sensors, illustrating the individual mechanical adjustments of the sensors.
Figure 6:
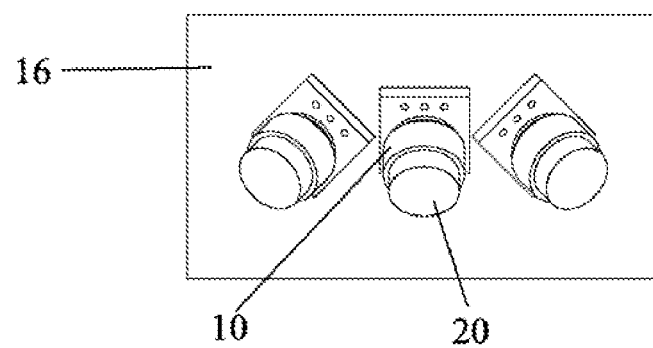
FIG. 6 is a front elevational view of the triple-sensor motion detector, showing the downward orientation of the three sensors.

FIGS. 5 and 6 show the three sensors 10A-10C assembled on a circuit board 16 of the triple-sensor motion detector 100. All three of the sensors are oriented such, that the field of detection is pointing downward. The ideal azimuth and elevation angles for the sensors 10 are determined for each individual sensor, in order to achieve the desired shape of the field of detection, as shown in FIGS. 3 and 4. The sensitivity of the sensors may also be individually adjusted by controlling the gain of each amplifier that processes the signal for each individual sensor. Examples of suitable sensors 10 are the RE200B, a dual sensor, used for the outboard sensors 10B and 10C, and the SBA42-54W, a quad sensor, used for the central sensor 10A. Both sensors are available from Nippon Ceramic Co., Ltd. of Japan.

Figure 8:
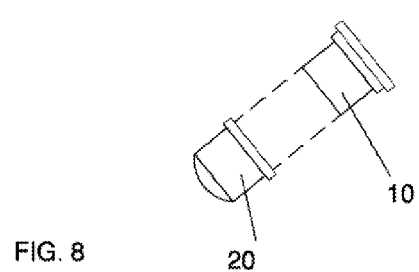
FIG. 8 is an exploded view of a sensor and a lens.

FIG. 8 is an exploded view of an IR Fresnel lens 20 that fits over the sensor 10. The lenses 20 are individually labeled as 20A, 20B, and 20C and each lens 20 may be different for each sensor 10. The Fresnel lenses 20 are used to shape the field of detection of each sensor 10 by focusing the IR signal and thereby allowing each sensor 10 to detect at a greater distance with a specific pattern. In the embodiment shown, the lens 20 fits snugly onto the front of the sensor 10. Such lenses are available in a variety of patterns. A very suitable lens 20 is one that generates a fan beam pattern, such as the NCL-3IL from Nippon Ceramic Co., Ltd. of Japan.

Figure 7:
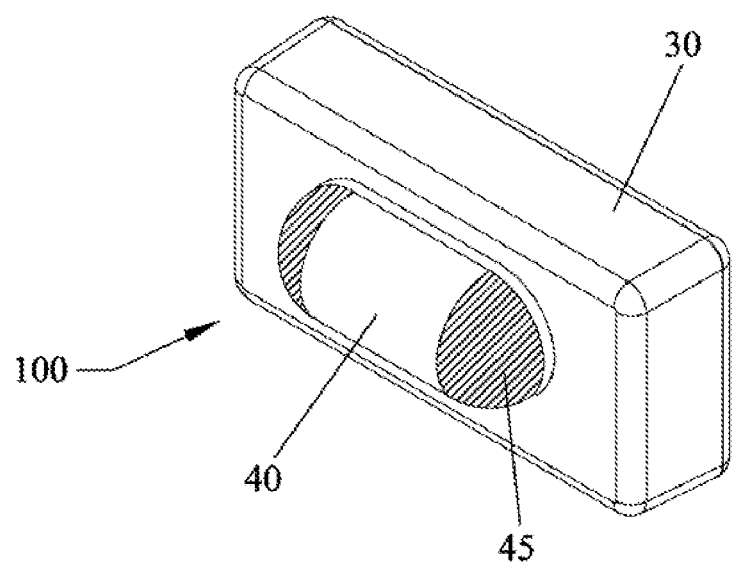
FIG. 7 is a perspective view of the triple-sensor motion detector according to the invention.

FIG. 7 is a perspective view of the triple-sensor motion detector 100, ready for installation. A housing 30 encloses the sensors 10 and a sensor cover 40 covers the three sensors 10. The sensor cover 40 may be specially adapted to restrict the sideward field of detection. For example, an IR blinder 45, i.e., a physical barrier that blocks infrared radiation, may be provided on each end of the cover 40 to limit the side-looking field of detection of the sensors 10B and 10C. It is understood that, depending on the specific application of the triple-sensor motion detector 100, the cover 40 may be adapted accordingly.

Figure 9:
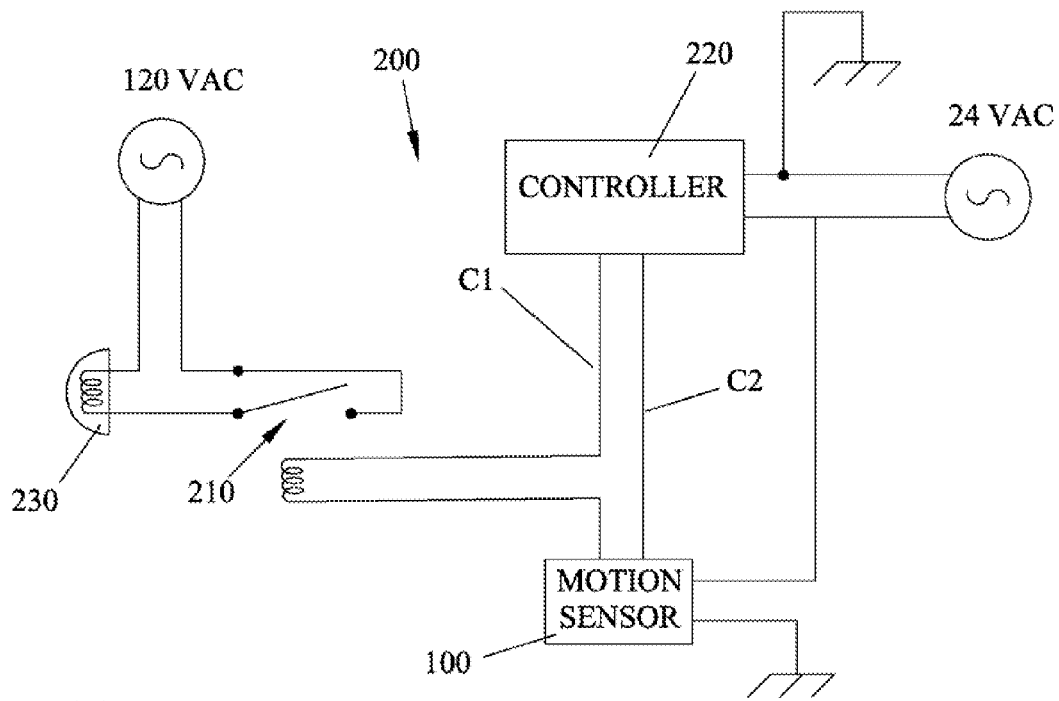
FIG. 9 is a schematic of a motion sensor according to the invention connected with a three-wire connection into existing circuitry.
Figure 10:
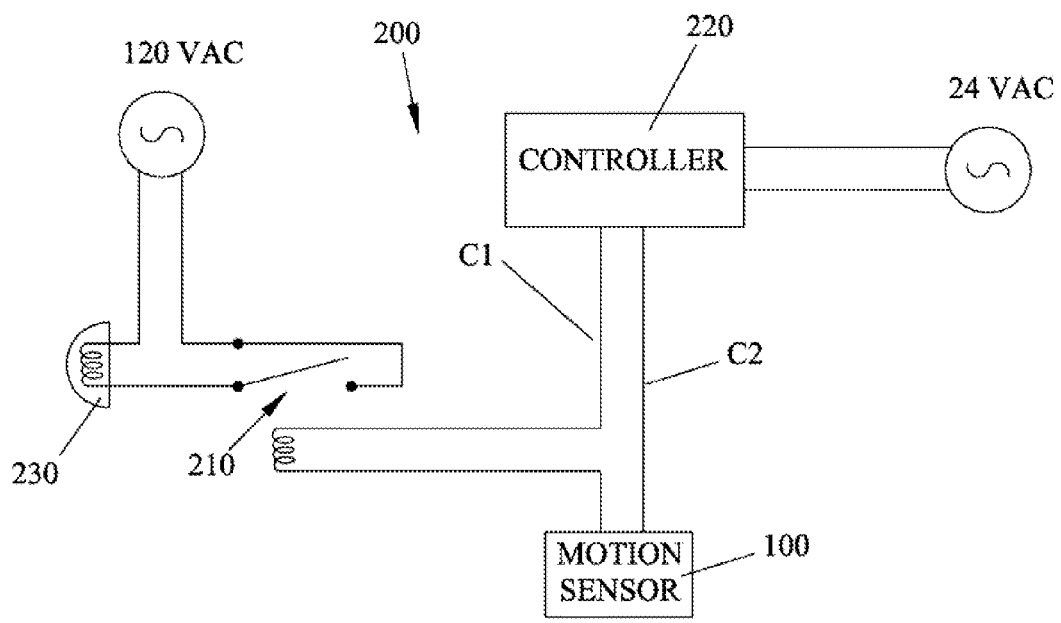
FIG. 10 is a schematic of a motion sensor according to the invention, showing a two-wire connection into existing circuitry.
Figure 11:
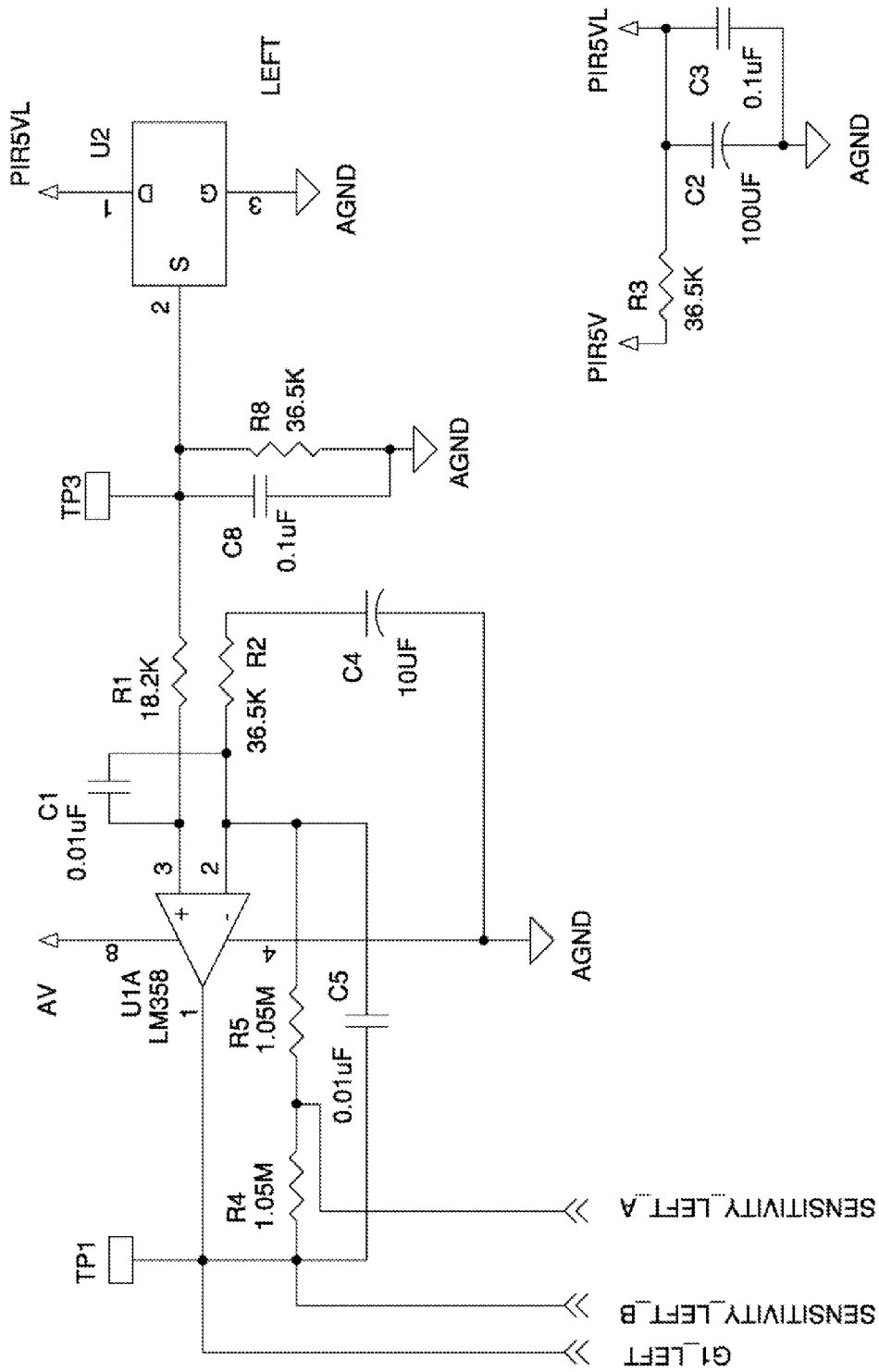
FIG. 11 is a schematic diagram of the triple-sensor motion detector, sheet 1 of 6.
Figure 12:
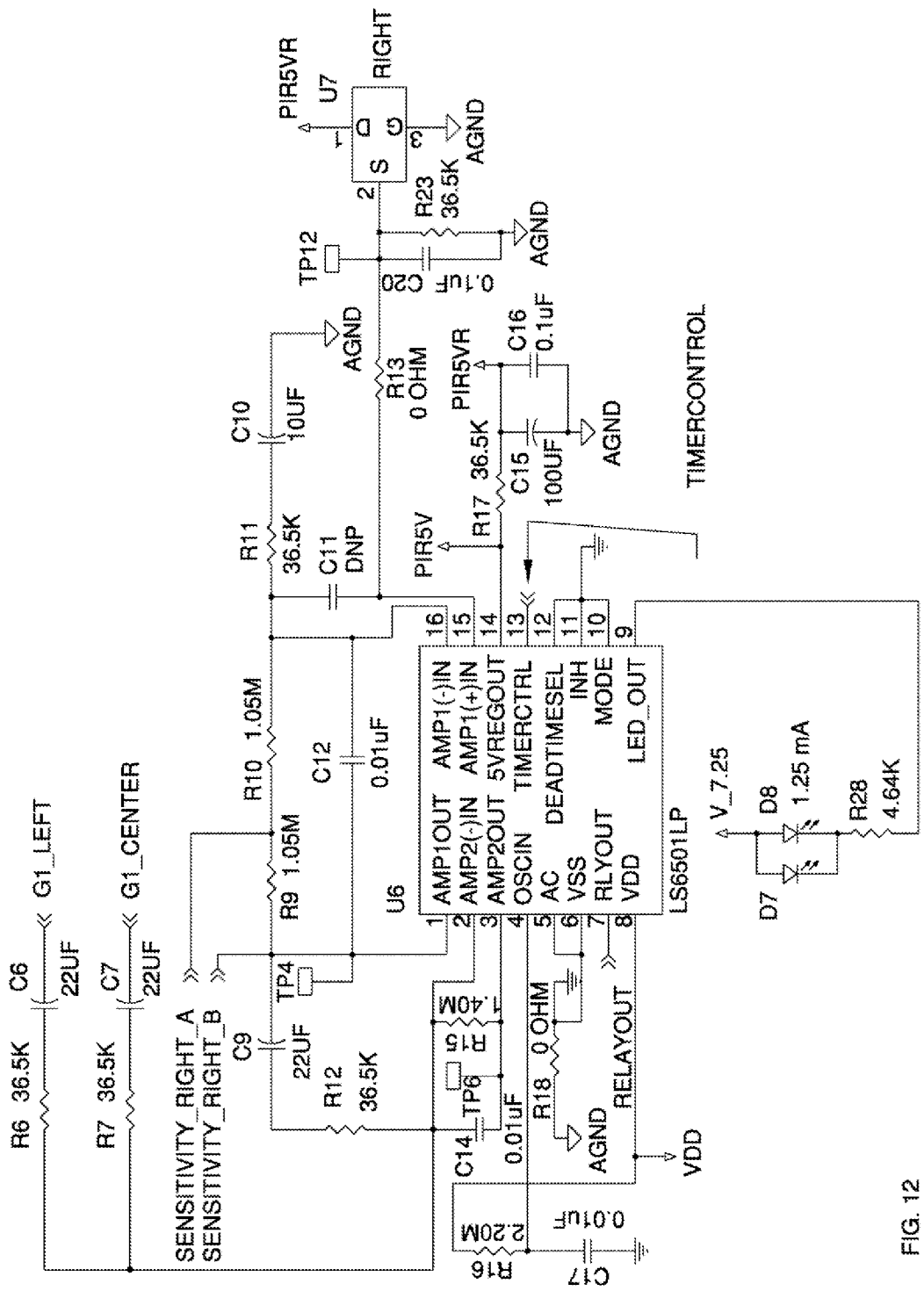
FIG. 12 is a schematic diagram of the triple-sensor motion detector, sheet 2 of 6.
Figure 13:
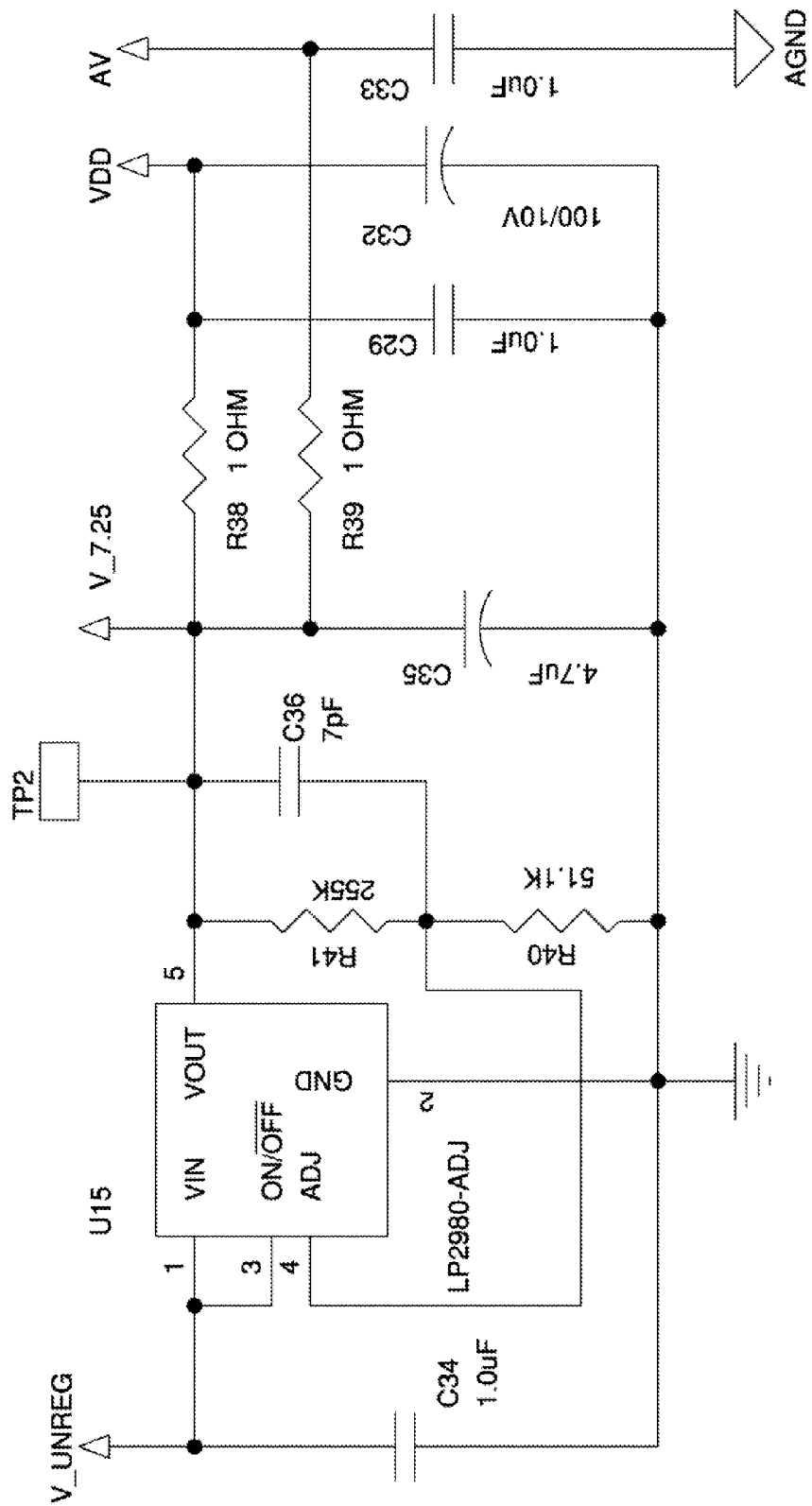
FIG. 13 is a schematic diagram of the triple-sensor motion detector, sheet 3 of 6.
Figure 14:
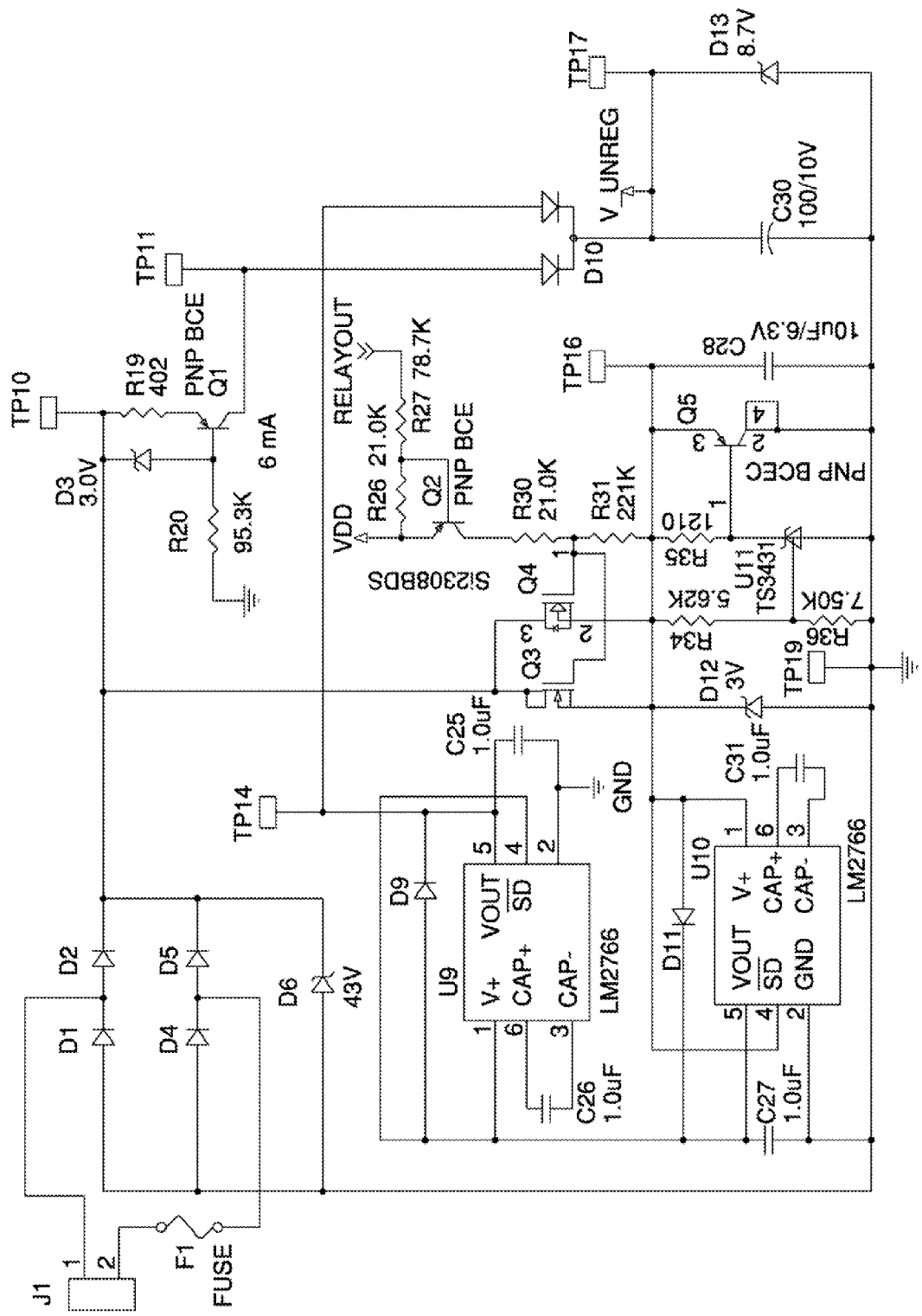
FIG. 14 is a schematic diagram of the triple-sensor motion detector, sheet 4 of 6.
Figure 15:
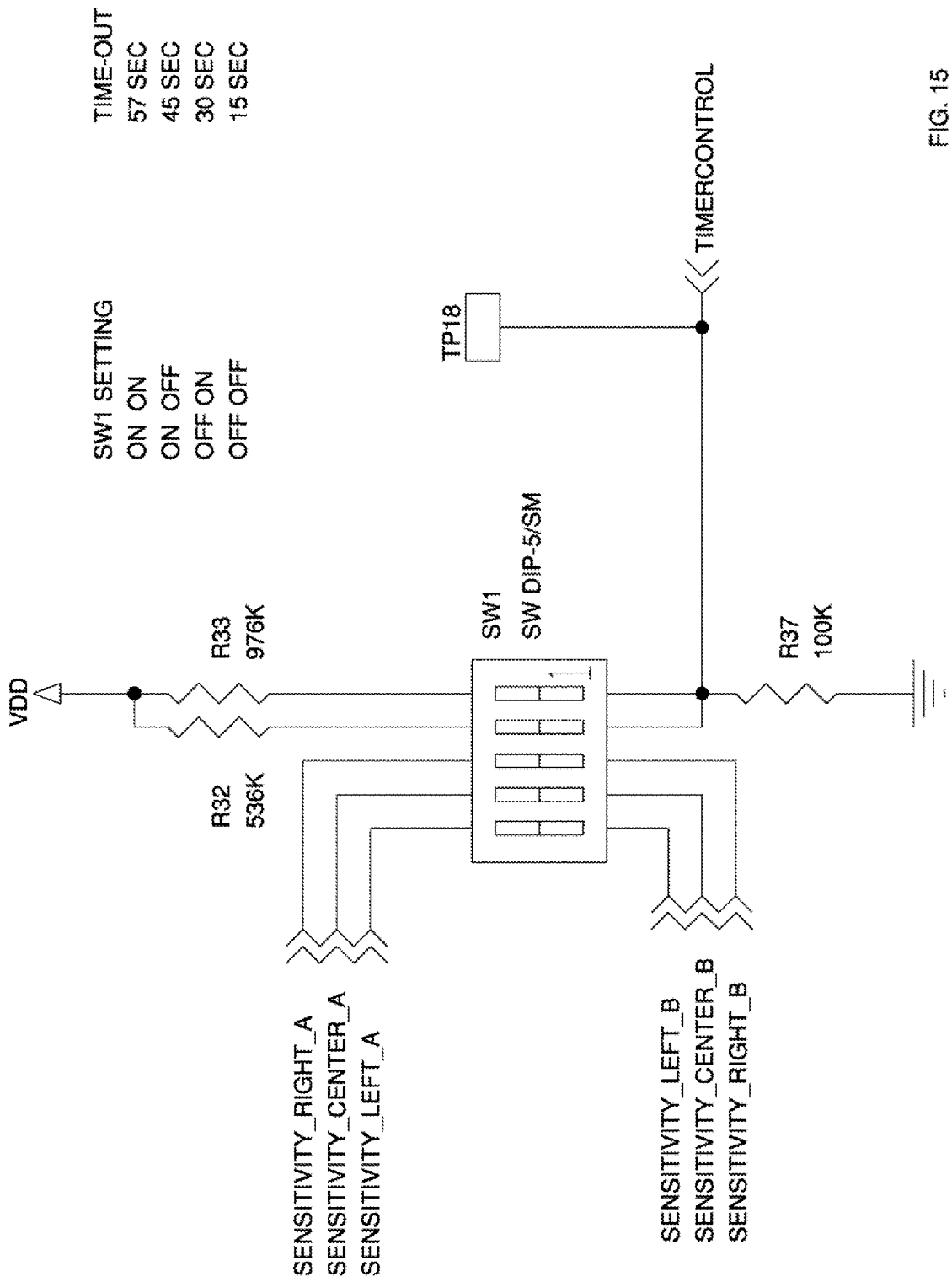
FIG. 15 is a schematic diagram of the triple-sensor motion detector, sheet 5 of 6.
Figure 16:
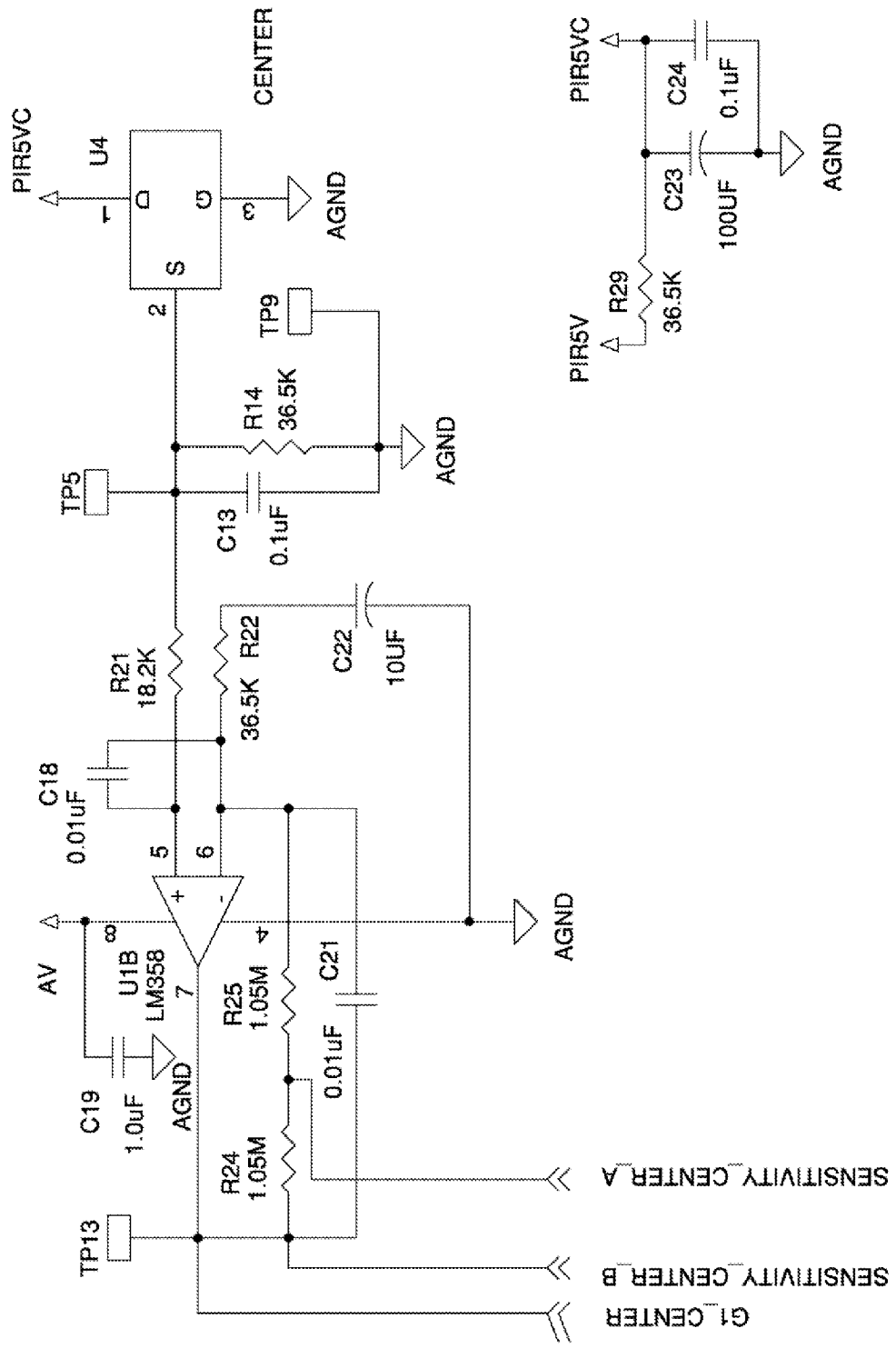
FIG. 16 is a schematic diagram of the triple-sensor motion detector, sheet 6 of 6.

FIGS. 9 and 10 are schematic illustrations of two alternative control circuits 200 for controlling illumination of lighting fixtures 230. FIG. 10 is a schematic illustration of a control circuit 200 that is a two-wire connection of the triple-sensor motion detector 100 with an existing switching relay 210. A controller 220 is used to control the illumination device 230 for the refrigeration or display case C. Two connections C1 and C2 connect the sensor 100 with the controller 220. These two connections C1,C2 allow the triple-sensor motion detector 100 to control the switching relay 210 and obtain power for operation of the motion detection module 100. The control circuit 200 is designed to draw a small current through the coil of the relay 210 to power the triple-sensor motion detector 100, without activating the relay 210. When the controller 220 is activated by the motion detection module 100, an increased amount of current is allowed to flow, which then activates the relay 210 and continues to power the controller 220. This completes the circuit 200 and activates the illumination device 230. FIG. 9 is a schematic illustration of a common three-wire circuit 200. The motion detection module 100 has a power source, typically 24 VAC, and switches on the controller 220 when motion is detected. Two conductors couple the motion detection module 100 to the switching relay circuit 210. A third conductor provides power to operate the motion detection module 100. A common ground with the relay 210 completes the power circuit.

The motion detection module 100 may be provided as a module that is to be connected with existing circuitry 200. Alternatively, the motion detection module 100 and the control circuit 200 may be incorporated into a unitary package. A solid-state relay may be used instead of a mechanical relay. Each of the motion sensors 10 may be provided with a switch that will allow the end-user to adjust the time delay between a triggering and a cessation of power to the illumination device.

FIGS. 11-16 are schematic diagrams of the triple-sensor motion detector 100.

What is claimed is:

1. A method of controlling illumination of a desired approach area to an object, said method comprising the steps of:
    a) providing a motion detection module that includes three passive infrared (PIR) motion sensors mounted on a circuit board, each PIR motion sensor being mounted physically independent of each other PIR motion sensor, the combination of said three PIR motion sensors providing a field of detection; and
    b) shaping said detection field by defining an azimuth angle, an elevation angle, and axial rotation angle for each PIR motion sensor, such that said combination of said three PIR motion sensors provides a desired shape of said field of detection that essentially corresponds to said desired approach area to said object; and
    c) providing a power switching circuit that interfaces between said motion detection module and an illumination device that provides illumination for said desired approach area;
        wherein motion inside said desired approach area is detected by said motion detection module and triggers said illumination device and motion outside said desired approach area is not detected, so as to avoid unnecessary triggering of said illumination device.

2. The method of claim 1 further comprising the step of:
    c) fitting an IR Fresnel lens onto one or more of said three PIR motion sensors, wherein said IR Fresnel lens produces a specific radiation pattern to further shape said shaped field of detection.

3. The method of claim 2, wherein different IR Fresnel lenses may be fitted onto different ones of the three PIR motion sensors.

4. The method of claim 1, wherein said each PIR motion sensor is a dual sensing pad, so as to further control a sensitivity and a radiation pattern in said field of detection.

5. The method of claim 1, wherein said each PIR motion sensor is a quad sensing pad, so as to further control a sensitivity and a radiation pattern in said field of detection.

6. The method of claim 1, wherein said three PIR motion sensors include any combination of quad and dual sensing pads, so as to further control a sensitivity and a radiation pattern in said field of detection.

7. The method of claim 1, further comprising the step of connecting said each PIR motion sensor to detection circuitry, wherein said detection circuitry has a predetermined gain to further control said shape of said shaped field of detection.

8. The method of claim 7, wherein said predetermined gain of said each PIR motion sensor is independently variable, so as to enable customization of said shaped field of detection.

9. The method of claim 1, further comprising the step of providing a user-adjustable time delay between a triggering of said illumination and a cessation of said illumination.

10. The method of claim 1 further comprising the step of fitting an IR opaque material in close proximity to one or more of said three PIR motion sensors, so as to further define said shape of said shaped field of detection.

11. The method of claim 1, wherein said motion detection module receives power from electrical current in a relay coil of said switching module, when said relay coil is in an on-state or in an off-state, and selectively enables and disables current flow to said illumination device.

12. The method of claim 11, wherein said power switching module includes a mechanical switching relay.

13. The method of claim 11, wherein said power switching module includes a solid-state relay.

14. The method of claim 13, wherein said solid-state relay turns on at a zero-crossing point of a power AC sine wave, so as to reduce an in-rush starting current in said illumination device and/or said power switching module.

15. The method of claim 14, wherein said solid-state relay includes a temperature-dependant current-limiting resistor to further limit said in-rush starting current.

16. The method of claim 1, wherein said three PIR motion sensors are mounted on a mounting surface of said circuit board and wherein said field of detection encompasses 180 degrees relative to a plane of said mounting surface.

* * * * *